United States Patent [19]
Frapin et al.

[11] Patent Number: 5,663,817
[45] Date of Patent: Sep. 2, 1997

[54] PROJECTOR OF NARROW FIELD MOVING IMAGES

[75] Inventors: Pascal Frapin, Cergy; Michel Lacroix, Bois D'Arcy, both of France

[73] Assignee: Thomson-CSF, Paris, France

[21] Appl. No.: 256,861

[22] PCT Filed: Dec. 21, 1993

[86] PCT No.: PCT/FR93/01276

§ 371 Date: Aug. 4, 1994

§ 102(e) Date: Aug. 4, 1994

[87] PCT Pub. No.: WO94/15237

PCT Pub. Date: Jul. 7, 1994

[30] Foreign Application Priority Data

Dec. 22, 1992 [FR] France ................ 92 15470

[51] Int. Cl.$^6$ ................................ G02F 1/1335
[52] U.S. Cl. ................ 349/5; 359/634; 250/201.4
[58] Field of Search ............... 359/40, 41, 42, 359/634; 250/201.4, 201.5

[56] References Cited

U.S. PATENT DOCUMENTS

| | | | |
|---|---|---|---|
| 4,481,413 | 11/1984 | Wilwerding | 250/204 |
| 5,093,563 | 3/1992 | Small | 250/201.9 |
| 5,262,895 | 11/1993 | LaDuke | 359/634 |
| 5,291,329 | 3/1994 | Wakimoto et al. | 359/662 |
| 5,315,330 | 5/1994 | Hamada | 359/40 |
| 5,383,052 | 1/1995 | Okazaki et al. | 359/204 |
| 5,414,551 | 5/1995 | Okazaki et al. | 359/205 |

FOREIGN PATENT DOCUMENTS

| | | | |
|---|---|---|---|
| 2414609 | 10/1974 | Germany | 359/41 |
| 0002916 | 1/1985 | Japan | 359/41 |
| 0104016 | 5/1988 | Japan | 359/40 |
| 0144020 | 6/1989 | Japan | 359/41 |
| 4113309 | 4/1992 | Japan | 359/40 |
| 4204919 | 7/1992 | Japan | 359/40 |
| 9422042 | 9/1994 | WIPO | 359/40 |

Primary Examiner—William L. Sikes
Assistant Examiner—Tiep H. Nguyen
Attorney, Agent, or Firm—Oblon, Spivak, McClelland, Maier & Neustadt, P.C.

[57] ABSTRACT

A structure including a laser source 1, a collimator 14, a liquid-crystal cell spatial modulator 7, a convergent lens and a zoom 10 function to project moving images with variable enlargements onto a screen 11 for use with air combat simulators.

6 Claims, 2 Drawing Sheets

PROJECTOR OF NARROW FIELD MOVING IMAGES

BACKGROUND OF THE INVENTION

1. Field of the Invention

The present invention relates to a projector of narrow field moving images.

2. Discussion of Background

In simulators such as air combat simulators, with projection sphere, wide optical field images of the sky and of the ground are projected onto this sphere and images of targets are overlaid onto the former images. The target image projectors can be arranged on either side of the cockpit for piloting the simulator, underneath the pilots' region of visibility, or on a pylon situated behind the cockpit. These projectors have to be as compact as possible so as to avoid mutual occultation.

The targets thus displayed are to be depicted for actual distances from the observer of between 200 and 6000 m approximately. The projectors have therefore to be furnished with an optical and electronic zoom of high ratio (30 for the example cited), and the projected images have to be highly contrasted in order to depict actuality as faithfully as possible.

Known projection devices include liquid-crystal cells illuminated under natural light by complex-optic projectors, and when desiring to have good resolution of the projected targets, cells of large size are necessary as therefore are expensive optics of correspondingly large diameter.

The subject of the present invention is a projector of narrow optical field moving images which are clearly contrasted, the projector employing the cheapest possible optical means.

SUMMARY OF THE INVENTION

The projection device of the invention includes a point light source arranged at the focus of a collimating optic followed by a device for spatially modulating a light beam over its cross section, by a divergent-beam forming optic and by an afocal zoom cooperating with a projection screen.

BRIEF DESCRIPTION OF THE DRAWINGS

The present invention will be better understood on reading the detailed description of several embodiments, given by way of non-limiting examples and illustrated by the attached drawing in which.

DESCRIPTION OF THE PREFERRED EMBODIMENTS

The invention is described below with reference to a target projector for an air combat simulator, but it is of course understood that it is not limited to such an application, and that it can be employed in other sectors in which there is a need to project images of moving objects with relatively narrow optical field, which objects may vary in size within wide proportions, that is to say whose simulated remoteness with respect to the observer may vary within large proportions (within a ratio of several tens for example).

Figure 1:
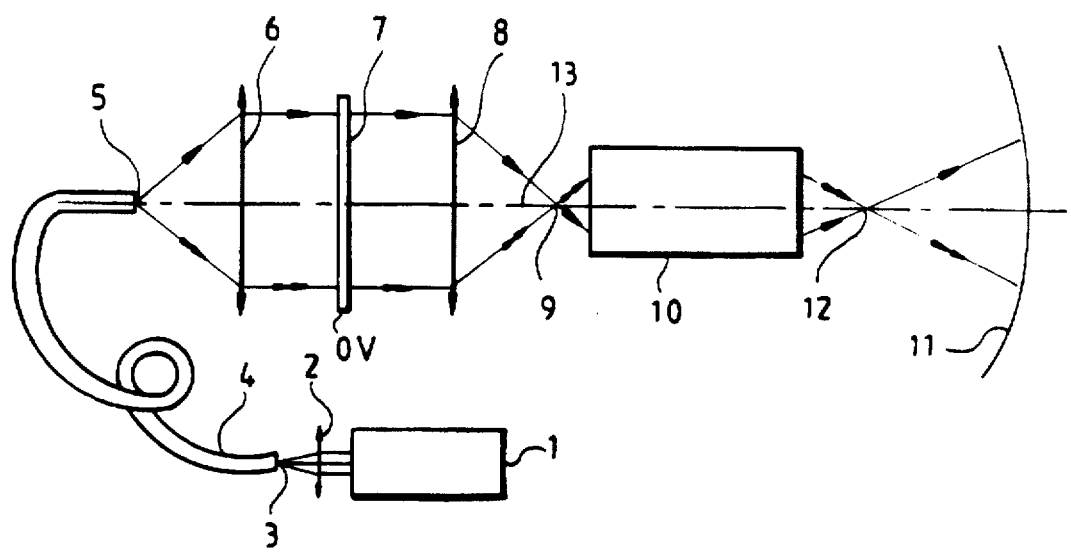
FIG. 1 is a diagrammatic view of a first embodiment of the device of the invention using an optical fibre.

The projection device depicted in FIG. 1 includes a light source 1 of high luminous intensity, advantageously a laser generator. In the case where a laser is used, it may for example be He-Ne monochrome multimode, or Ar-Kr white multimode. In front of the generator 1 is placed an optic 2 for coupling to the end 3 of an optical fibre 4 for transporting the light ray from this generator. The other end 5 of the fibre 4, which is akin to a point light source, is placed at the focus of an optical collimating device 6, which is a simple convergent lens in the present case. The optical device 6 is followed by a beam modulator 7. In the present example, this modulator is a liquid-crystal cell with matrix addressing, furnished with its usual polarizers. The cell 7 has dimensions corresponding substantially to those of the beam leaving the lens 6. Its resolution may for example be between 250×250 pixels and 1000×1000 pixels, but may just as well be better. The cell 7 receives a video signal V produced in a manner known per se by a video generator (not depicted). The cell 7 is followed by an optical device 8 similar to the device 6. Slightly beyond the focus 9 of the device 8, precisely where the beam leaving 8 begin to diverge, is arranged an afocal zoom 10. The location of the zoom 10 is determined in such a way that its entrance face is placed precisely where the diameter of the beam leaving the focus 9 is practically equal to that of this entrance face. The exit beam from the zoom 10 is projected onto a screen 11 which, in the present case, is the screen of the air combat simulator. On exiting the zoom 10, the light beam converges to the point 12.

The devices 6, 7, 8 and 10 are centered on an optical axis 13 passing through 5, 9 and 12. The modulator 7 spatially modulates over its cross section the collimated beam from the lens 6, thus providing the points 9 and 12 with modulated point sources.

Figure 2:
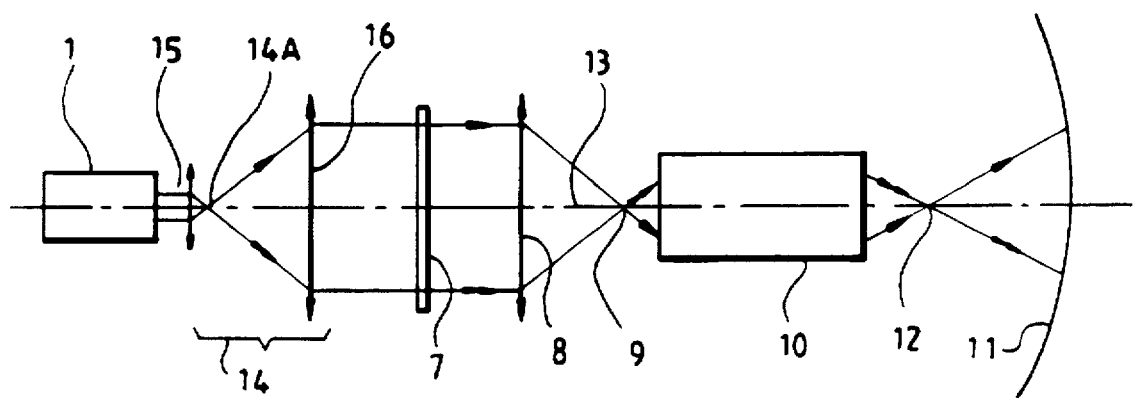
FIG. 2 is a diagrammatic view of a second embodiment of the device of the invention with direct coupling of the light source.

For the embodiment of FIG. 2, the same elements as those of FIG. 1 are assigned the same numerical references. This embodiment relates to the case in which the laser generator 1 may be arranged on the axis 13 in proximity to the cell 7. In this case, of course, the optical fibre of FIG. 1 is dispensed with. The laser 1 is followed by a beam enlarger 14 including for example a small convergent lens 15 whose focus coincides with the focus of a lens 16 similar to the lens 6 of FIG. 1. The laser beam collimated by the lens 16 is treated in the same way as that from the lens 6. Of course, dispensing with the optical fibre 4 increases the luminous efficiency of the projection device by eliminating the laser/optical fibre coupling losses.

Figure 3:
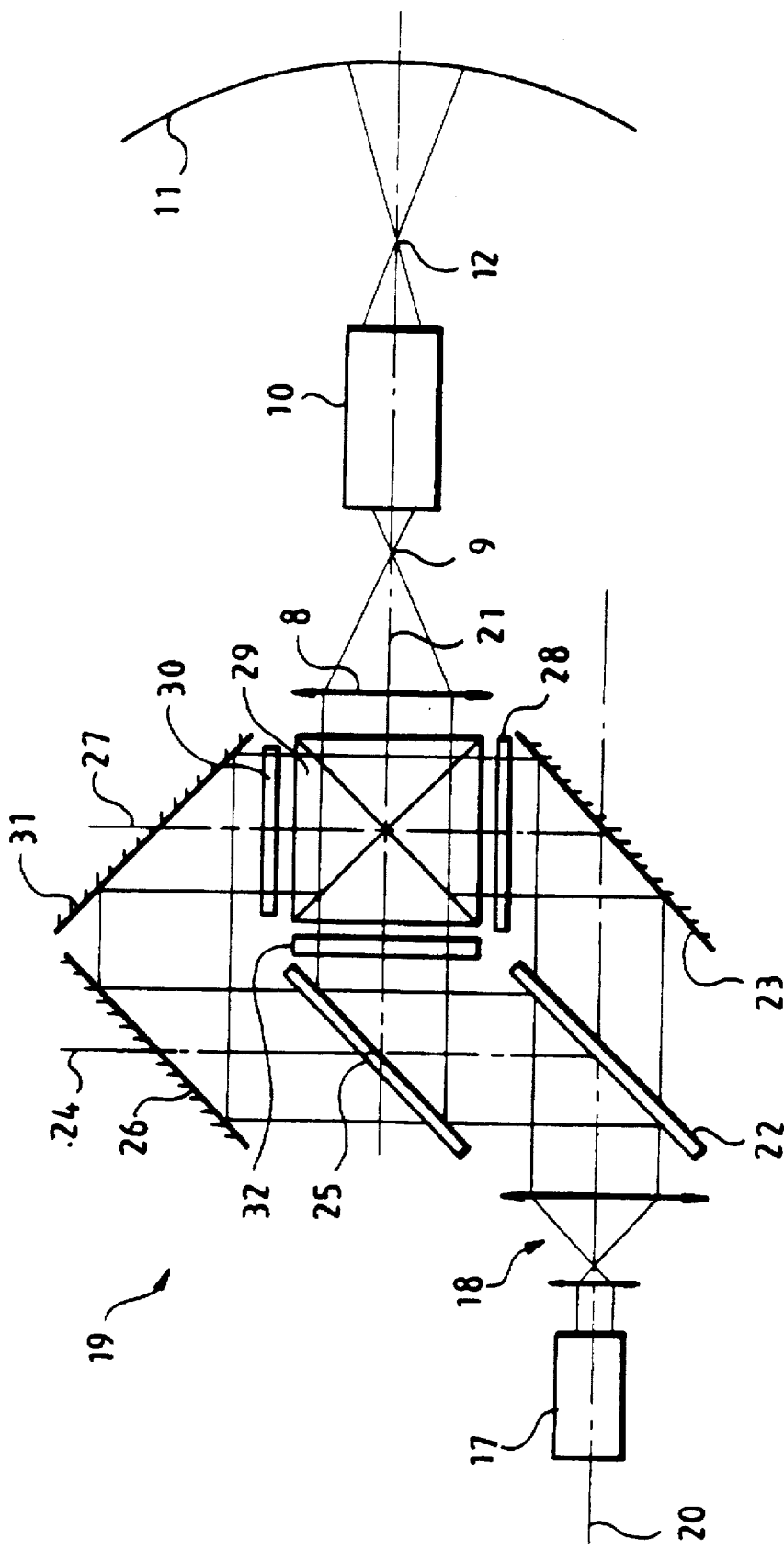
FIG. 3 is a diagrammatic view of a third embodiment of the device of the invention making it possible to obtain colour images.

Depicted in FIG. 3 is an embodiment making it possible to obtain a colour image. The laser 17 used is a white laser, for example an Ar/Kr mixed-gas laser. This laser 17 is for example associated with a beam enlarger 18 similar to the enlarger 14 of FIG. 2. Between the enlarger 18 and the exit lens 8 (cooperating with the same zoom 10), is interposed a device 19 for separating the RGB components obtained from the white light of the laser 17. This device 19 includes three cells modulating each of these RGB components. Given the special compact arrangement of the elements of the device 19, the optical axis 20 of the laser 17 and of the enlarger 18 is offset with respect to the optical axis 21 common to the lens 8 and to the zoom 10.

The device 19 comprises a first semi-reflecting dichroic mirror 22 arranged at 45° with respect to the axis 20 downstream of the enlarger 18. Parallel to the mirror 22 and downstream thereof is arranged, on the same axis 20, a reflecting mirror 23 whose reflecting face is pointed towards the mirror 22.

Consider an optical axis 24 perpendicular to the axis 20 and passing through the point of incidence of the axis 20 with the mirror 22. On this axis 24, parallel to the mirror 22 and downstream thereof are arranged a second dichroic mirror 25 and a reflecting mirror 26 whose reflecting face is pointed towards the mirror 25.

Consider an optical axis 27 perpendicular to the axis 20 and passing through the point of incidence of the axis 20 with the mirror 23. On this axis 27 and downstream of the mirror 23 are arranged, in this order, a first liquid-crystal cell 28, a dichroic prism 29, a second liquid-crystal cell 30 and a reflecting mirror 31 whose reflecting face is pointed towards the mirror 23. The cells 28 and 30 are perpendicular to the axis 27 and the mirror 31 is inclined at 45° with respect to the axis 27, but is perpendicular to the mirrors 23 and 26. The prism 29 has a square cross-section, two of the sides of which are perpendicular to the axis 27, and the other two parallel to this axis. The prism 29 is arranged in such a way that the axis 21 passes through its centre. This axis 21 is perpendicular to the axes 24 and 27, and meets the axis 27 at its point of incidence with the mirror 25. A third liquid-crystal cell 32 is arranged between the mirror 25 and the prism 29, perpendicularly to the axis 21. The three cells 28, 30 and 32 are identical to the aforesaid cell 7 and are furnished with appropriate polarizers (not depicted).

The collimated beam leaving the enlarger 18 is partly transmitted and partly reflected by the mirror 22. This mirror is treated in such a way that the transmitted beam (heading for the mirror 23) includes only the red component R of the white light beam leaving the enlarger 18, the reflected beam (heading for the cell 28 after reflection on the mirror 25) containing the green G and blue B components. This reflected beam is partly transmitted by the mirror 25 (towards the cell 30 after having been reflected by the mirrors 26 and 31) and partly reflected (towards the cell 32). The mirror 25 is treated in such a way as to reflect the G component and transmit the B component.

Thus, the cells 28, 30 and 32 receive the R, B and G components respectively, and therefore each modulate only the corresponding component. The prism 29 combines these three modulated components, and therefore the beam leaving this prism and conveyed to the zoom 10 is a modulated three-colour beam, thus making it possible to project colour images onto the screen 11. Of course, the R, G, B components are not necessarily separated in the order indicated above, and for example the mirror 22 could transmit the G or B component instead of the R component, and reflect the other two components towards the mirror 25 which would be treated accordingly.

The arrangement described above the device 19 is compact and requires few elements, but it is clearly understood that this structure is not the only possible one, and that any structure making it possible to separate the chromatic components of a non-monochrome light beam, to direct each of them to a modulating cell, and to mix the components thus modulated may serve.

Of course, the set of optical elements from the source up to the zoom is advantageously movable with respect to the screen 11.

We claim:

1. A device for projecting narrow optical field moving images, said device comprising:
    a laser generator for generating a laser point light source;
    a collimating optic means having a first focal point coinciding with said point light source;
    a spatial modulator for spatially modulating a light beam output from said collimating optic wherein said spatial modulation occurs over an entire cross section of said light beam and wherein said spatial modulator is controlled by a video generator voltage;
    a convergent-beam forming optic receiving an output of said spatial modulator and providing a converging beam having a second focal point;
    an afocal zoom lens having an entrance face with a first diameter wherein said entrance face of said zoom lens is positioned spaced downstream from said second focal point so that a diameter of a beam leaving said second focal point is substantially equal to said diameter of said entrance face; and
    a projection screen receiving an output from said zoom lens to provide a projection of said moving images.

2. The device according to claim 1 wherein a beam-transport optical fiber is arranged between said layer and said collimating optic focal point.

3. The device according to claim 1 wherein said spatial modulator is a liquid-crystal cell.

4. The device according to claim 1 further including:
    a device for separating chromatic components of a non-monochrome light beam arranged between said collimating optic and said convergent-beam formic optic;
    a respective spatial modulator arranged between said collimating optic and said convergent-beam formic optic for each of said chromatic components; and
    a mixer arranged between said collimating optic and said convergent-beam forming optic.

5. The device according to claim 4 wherein said device for separating components includes at least one dichroic mirror.

6. The device according to claim 5 wherein said mixer device is a dichroic prism.

* * * * *